United States Patent [19]

Brush, Jr. et al.

[11] Patent Number: 4,930,200

[45] Date of Patent: Jun. 5, 1990

[54] METHOD OF MAKING AN ELECTRICAL FILTER CONNECTOR

[75] Inventors: Robert W. Brush, Jr., Flemington; Robert M. Scharf, Bedminster; Campbell Davie, Rahway; Arthur A. Lutsky, Springfield; Frank S. Siano, Monroe Township, Middlesex County, all of N.J.

[73] Assignee: Thomas & Betts Corporation, Bridgewater, N.J.

[21] Appl. No.: 386,931

[22] Filed: Jul. 28, 1989

[51] Int. Cl.[5] .......... H01G 7/00

[52] U.S. Cl. .......... 29/25.42; 439/607; 333/185

[58] Field of Search .......... 29/25.42; 439/607, 608; 333/181-185

[56] References Cited

U.S. PATENT DOCUMENTS

| | | | |
|---|---|---|---|
| Re. 31,470 | 12/1983 | Bedard et al. | 333/204 |
| 2,812,510 | 11/1957 | Schulz | 340/174 |
| 2,915,716 | 6/1959 | Hattersley | 333/73 |
| 2,922,968 | 1/1960 | Van Patten | 333/73 |
| 2,984,802 | 5/1961 | Dyer et al. | 333/73 |
| 3,200,355 | 8/1965 | Dahlen | 333/79 |
| 3,275,953 | 9/1966 | Coda et al. | 333/79 |
| 3,275,954 | 9/1966 | Coda et al. | 333/79 |
| 3,379,943 | 4/1968 | Breedlove | 317/258 |
| 3,447,104 | 5/1969 | Schor | 333/79 |
| 3,462,715 | 8/1969 | Schor | 333/79 |
| 3,535,676 | 10/1970 | Schultz, Sr. | 339/143 |
| 3,537,704 | 4/1971 | Tarver | 339/14 |
| 3,538,464 | 11/1970 | Walsh | 333/79 |
| 3,539,973 | 11/1970 | Antes et al. | 339/143 |
| 3,551,874 | 12/1970 | Volinskie | 339/17 |
| 3,705,378 | 12/1972 | Elkins | 339/156 |
| 3,745,431 | 7/1973 | Imamura et al. | 317/258 |
| 3,879,691 | 4/1975 | Fritz | 333/79 |
| 4,079,343 | 3/1978 | Nijman | 333/79 |
| 4,083,022 | 4/1978 | Nijman | 333/79 |
| 4,114,120 | 9/1978 | Lupfer | 333/84 |
| 4,126,840 | 11/1978 | Selvin | 333/79 |

(List continued on next page.)

FOREIGN PATENT DOCUMENTS

| | | |
|---|---|---|
| 0123457 | 1/1984 | European Pat. Off. . |
| 0124264 | 11/1984 | European Pat. Off. . |
| 3016315 | 11/1981 | Fed. Rep. of Germany . |

OTHER PUBLICATIONS

Drawing Sheet, entitled "Rolm Shielded Filtered Telephony", 1 page, dated May 11, 1988.

Allied Amphenol Products Catalog, entitled "Bendix ® EMI Filter Connector", front & back covers and pp. 2 and 3, dated May 1984.

Thomas & Betts Catalog, entitled "The XD/P ™ Extended Density/Performance Two-Piece PCB Connector System", 5 printed pages, dated 1988.

ITT Cannon Catalog, entitled "D Subminiature Rectangular Connectors", front cover and pp. 14 and 15, Dated Dec. 1980.

*Primary Examiner*—P. W. Echols

*Attorney, Agent, or Firm*—Robert M. Rodrick; Salvatore J. Abbruzzese

[57] ABSTRACT

An improved method of making an electrical filter connector includes the steps of providing a substrate with a plurality of metallized openings therethrough for electrical individual attachment to electrical contacts of the connector. The substrate is further provided with a metallized strip on a surface thereof spaced from the metallized openings. A plurality of capacitors are attached to the substrate. First conductive capacitor terminations are individually electrically attached to respective portions of the metallized openings and second conductive capacitor terminations are electrically attached in common to the metallized strip. A curable dielectric material is applied onto the dielectric body of each capacitor between each of the conductive terminations thereof. Each of the electrical contacts of the connector is electrically attached to a respective one of the metallized openings of the substrate.

19 Claims, 4 Drawing Sheets

U.S. PATENT DOCUMENTS

| | | | |
|---|---|---|---|
| 4,144,509 | 3/1979 | Boutros | 333/181 |
| 4,187,481 | 2/1980 | Boutros | 333/182 |
| 4,275,945 | 6/1981 | Krantz et al. | 339/147 |
| 4,329,665 | 5/1982 | Kuwai et al. | 333/182 |
| 4,371,226 | 2/1983 | Brancaleone | 339/147 |
| 4,376,922 | 3/1983 | Muzslay | 333/182 |
| 4,386,819 | 6/1983 | Asick et al. | 339/147 |
| 4,407,552 | 10/1983 | Watanabe et al. | 339/143 |
| 4,419,713 | 12/1983 | Levinson | 361/321 |
| 4,424,552 | 1/1984 | Saint Marcoux | 361/306 |
| 4,458,220 | 7/1984 | Carter et al. | 333/182 |
| 4,484,159 | 11/1984 | Whitley | 333/182 |
| 4,493,007 | 1/1985 | Sugitami | 361/307 |
| 4,494,092 | 1/1985 | Griffin | 333/182 |
| 4,500,159 | 2/1985 | Briones et al. | 339/147 |
| 4,507,630 | 3/1985 | Wakino | 333/182 |
| 4,519,665 | 5/1985 | Althouse et al. | 339/147 |
| 4,552,420 | 11/1985 | Eigenbrode | 339/14 |
| 4,580,866 | 4/1986 | Hagner | 339/147 |
| 4,589,720 | 5/1986 | Aujla et al. | 339/147 |
| 4,682,129 | 7/1987 | Bakermans et al. | 333/184 |
| 4,726,790 | 2/1988 | Hadjis | 439/620 |
| 4,741,710 | 5/1988 | Hogan et al. | 439/620 |
| 4,761,147 | 8/1988 | Gauthier | 439/607 |
| 4,791,391 | 12/1988 | Linnell et al. | 333/184 |
| 4,792,310 | 12/1988 | Hori et al. | 439/620 |
| 4,804,332 | 2/1989 | Pirc | 439/620 |

METHOD OF MAKING AN ELECTRICAL FILTER CONNECTOR

FIELD OF THE INVENTION

The present invention relates to electrical connectors and more particularly to a method of making an electrical filter connector for reducing electromagnetic interference and for providing higher voltage capability.

BACKGROUND OF THE INVENTION

Electrical filter connectors for filtering electronic equipment from electromagnetic interference (EMI) and radio frequency interference (RFI) are well known in the electrical connector art. Such electrical filter connectors may utilize monolithic chip capacitors as shown in U.S. Pat. No. 4,500,159 (Hogan et al.), thick film capacitors as shown in U.S. Pat. No. 4,791,391 (Linell et al.) or ferrite materials as shown in U.S. Pat. No. 4,761,147 (Gauthier), to identify several known examples While there are many applications for electrical filter connectors, increasing need has developed for use of such filter connectors in telecommunications and data-processing systems. In such systems, in addition to protecting the electronic equipment against EMI and RFI interference, there is also need to protect the equipment against electrical power surges that result from electrostatic discharges caused, for example, by a lightning strike. While various of the known filtering devices as identified hereinabove, have been used to provide such filtering capability, size and cost are placing further demands upon the design of such electrical filter connectors. For example, enhanced filtering effectiveness can be achieved by smaller size devices due to a shorter conduction path from the capacitors to the ground plane on system circuit boards. Such size demands for reduced electronic devices, including connectors, presents a difficult problem in providing a filtering device capable especially of meeting the higher voltages experienced in power surge conditions without breakdown of the filtering device One known technique of increasing the dielectric strength of the filtered connector is to cover the capacitors with dielectric oil. Such a technique disadvantageously requires some physical constraint for containing the oil and in some instances, depending upon the type of oil used, is hazardous. Accordingly, there is present need for an electrical filter connector that includes filtering devices enabling the connector to be constructed in the desired size and to meet the higher voltage demands occasioned by power surges as well as to be cost effective in its construction for manufacture.

SUMMARY OF THE INVENTION

It is an object of the present invention to provide an improved method of making an electrical filter connector.

It is a further object of the present invention to provide an improved method of making an electrical filter connector having a capacitor sub-assembly with enhanced dielectric 20 strength.

In accordance with the invention, an improved method is provided for making an electrical connector of the type including an insulative housing supporting a plurality of electrical contacts, a metal shell supported by the housing substantially surrounding the contacts and a plurality of capacitive elements included therein.

The improved method comprises the steps of providing a substrate with metallized openings therethrough in receipt therein of individual electrical contacts and with a metallized strip on a surface of the substrate spaced from the metallized openings. A plurality of capacitive elements are provided, each being of the type having a first termination and a second termination with a dielectric body therebetween. The first terminations are electrically attached individually to respective portions of the metallized openings and the second terminations are electrically attached to the metallized strip. A curable dielectric material is applied onto the dielectric body of each capacitive element. Each of the metallized openings of the substrate are electrically attached to the respective electrical contacts.

In a preferred form of the invention, the capacitive elements are attached to the substrate initially with the curable dielectric material then applied to the dielectric body. Upon attachment of the capacitive elements to the substrate, a space is formed between the dielectric body and the substrate. An aperture is provided through the substrate adjacent each dielectric body, each aperture being in communication with a respective space. The curable dielectric material is then disposed into each space through the apertures.

DETAILED DESCRIPTION OF THE PREFERRED EMBODIMENTS

Figure 1:
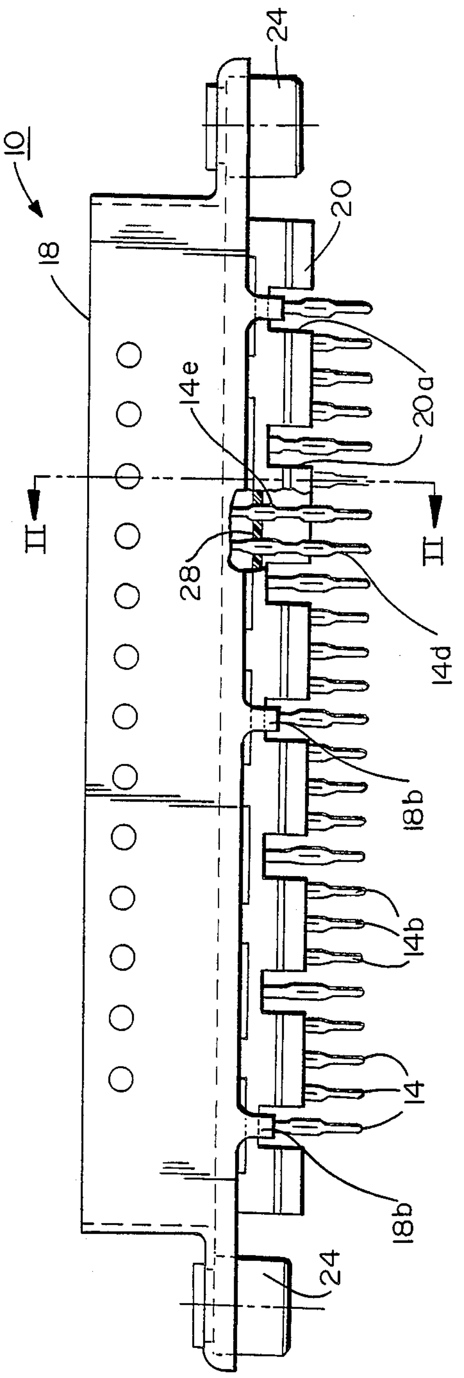
FIG. 1 is a side elevation view of an electrical filter connector in accordance with a preferred embodiment of the invention, partially sectioned to reveal internal construction details thereof.
Figure 2:
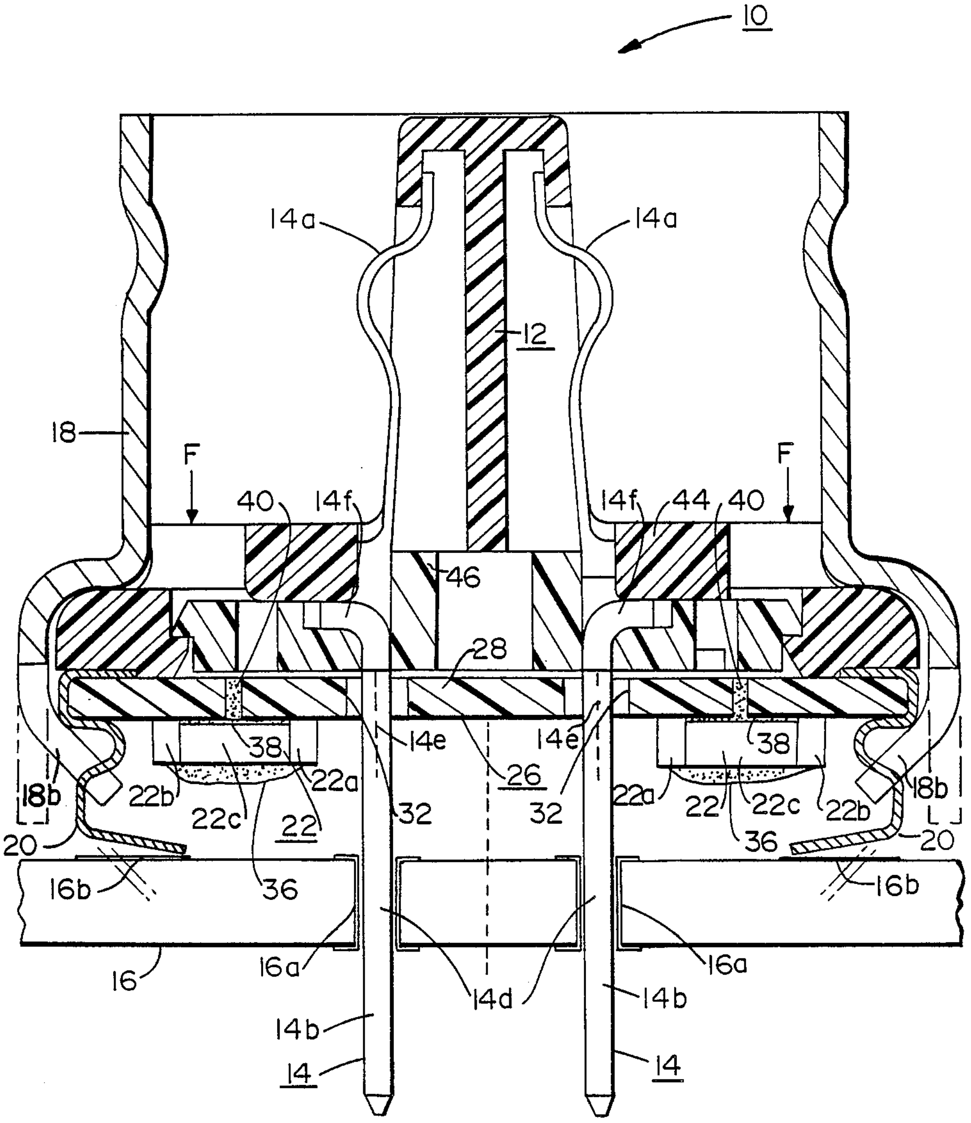
FIG. 2 is a cross-sectional view of the electrical filter connector of FIG. 1 as seen along viewing lines II—II of FIG. 1, with the further showing of a system circuit board to which the electrical filter connector is connected.

Referring now to the drawings, there is shown in FIGS. 1 and 2 an electrical filter connector 10 in accordance with a preferred embodiment of the invention. The connector 10 includes an elongate insulative housing 12 supporting in two longitudinally disposed transversely spaced rows a plurality of electrical contacts 14. Each of the contacts 14 comprises an upper resilient spring section **14*a* for electrical engagement with contacts of a complementary electrical connector and pin sections 14*b* for electrical engagement with conductive circuits on a system circuit board 16**, as will be described more fully hereinafter.

A metal shell 18 is supported by the housing 12, the shell having walls substantially surrounding the electrical contacts in a manner to provide EMI and RFI protection. A resilient ground spring 20 is supported by the connector housing 12 along each of the longitudinal edges thereof, the ground spring being in electrical engagement with the metal shell 18. As illustrated in FIG. 1, the ground spring 20 has a series of cutaway portions 20*a* which provide enhanced resiliency of the spring 20. Each of the ground springs 20 is adapted, as will be further described hereinafter, to be in electrical connection with capacitors 22 provided in the electrical connector for electronic interference filtering. Upon attachment of the electrical filter connector 10 to the system circuit board 16, the metal shell 18 thereof is secured to the board 16 with fasteners inserted through bushings 24 disposed at the longitudinal ends of the shell 18.

Figure 3:
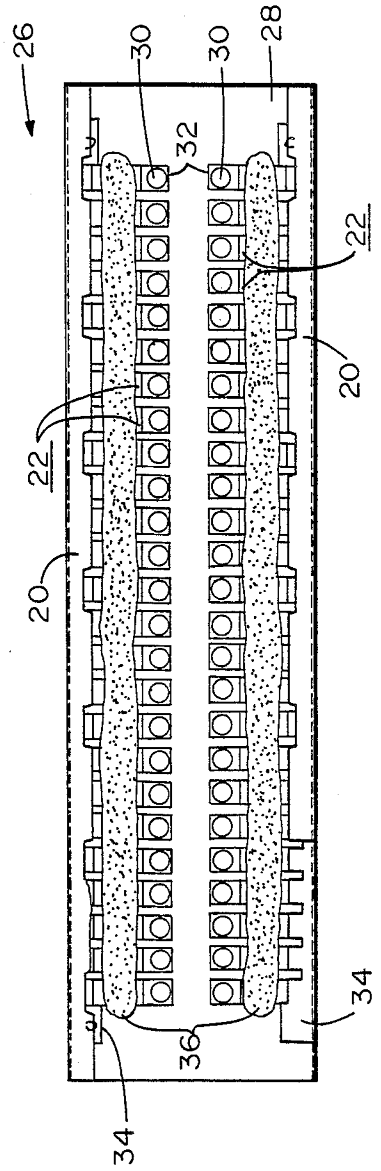
FIG. 3 is a bottom plan view of a capacitor sub-assembly in accordance with the improvement of the electrical filter connector of FIG. 1.
Figure 4:
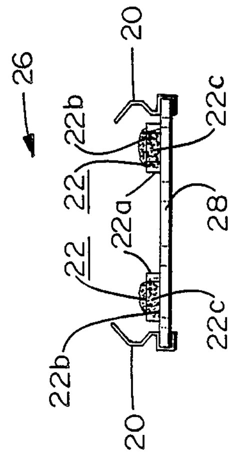
FIG. 4 is a side elevation view of the capacitor sub-assembly of FIG. 3.

By further reference now to FIGS. 3 and 4, an improvement of the electrical filter connector in accordance with a preferred embodiment of the invention is described. As shown therein, a capacitor sub-assembly 26 comprises an elongate insulative substrate 28 which supports thereon the resilient ground springs 20 and a plurality of capacitors 22. The substrate 28 preferably comprises a printed circuit board. The printed circuit board 28 includes therethrough a plurality of openings 30, each of which has its interior walls and an adjacent surface of the printed circuit board 28 metallized with conductive material by known conventional techniques. The metallized surfaces of the openings 30 and the surrounding surface areas, provide conductive elements 32 for electrical connection to the electrical contacts and capacitors, as will be described. The openings 30 are disposed in two longitudinally extending transversely spaced rows in a pattern the same as the electrical contacts such that the pin sections 14*b* thereof may be received therethrough.

Still referring to FIGS. 3 and 4, the printed circuit board 28 further includes along each of its longitudinal edges a metallized strip 34 extending along the respective edges for nearly the length of the printed circuit board 28. The metallized strips 34 each provide a conductive member for attachment to the capacitors 22 and to the ground springs 20. In the preferred embodiment, the capacitors 22 are discrete, monolithic, multilayer chip capacitors. As is known, each such capacitor 22 is formed generally in parallelepiped configuration having a pair of conductive terminations 22*a* and 22*b* disposed externally on a dielectric body 22*c* with a dielectric surface extending between the terminations 22*a* and 22*b* as further shown in FIG. 2. The metallized portions 32 and the metallized strips 34 in a particular form of the printed circuit board 28 are provided identically on both major surfaces of the substrate 28.

Figure 5:
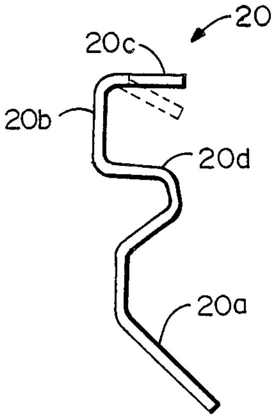
FIG. 5 is an enlarged side view of the ground spring of the capacitor sub-assembly in accordance with a preferred embodiment thereof, showing in phantom a particular ground spring construction.

With further reference now to FIG. 5, the details of the ground spring 20 are described. The spring 20 is formed of a resilient conductive material, such as phosphor bronze and includes a angularly formed portion 20*a* which is adapted to obliquely engage the upper surface of the system circuit board 16. The upper portion of the spring is formed generally in the shape of a sideways U-shaped cup 20*b* for attachment to the side edges of the printed circuit board 28. The cup 20*b* includes extents 20*c* and 20*d* that are adapted to lie adjacent opposed surfaces of the printed circuit board 28 and adjacent the metallized strips 34. Extent 20*c*, as illustrated in phantom in FIG. 5, may be formed to project inwardly into such cup so as to provide a resilient attachment feature whereby the ground spring may be temporarily held on the edge of the printed circuit board 28 prior to permanent securement thereto.

Turning now again to FIGS. 3 and 4 as well as to FIG. 2, the assembly of the capacitor sub-assembly 26 and its final construction are described. The plurality of capacitors 22 are each suitably held in alignment with the respective apertures 30 with the first set of terminations 22*a* in contact with respective metallized portions 32 and with the second set of terminations 22*b* in each row being in contact with a respective metallized strip 34. The capacitors are soldered thereto such that terminations 22*a* are individually electrically connected to the metallized openings 30 and the terminations 22*b* are electrically attached in common in each row to a metallized strip 34. The ground springs are temporarily held onto the respective edges of the printed circuit board 28 by the cup portion 20*b*. The extents 20*c* and 20*d* of the springs 20 are then soldered to the metallized strips 34, thereby electrically connecting each of the ground springs 20 to a row of capacitor terminations 22*b*. The capacitors 22 and the ground springs 20 may be soldered in a common operation.

Subsequent to the soldering of the capacitors 22 and the ground springs 20 to the board 28, in accordance with the invention, a quantity of dielectric material is applied onto the capacitors. As illustrated in FIGS. 2, 3 and 4, a dielectric material 36 is disposed on the dielectric surface of each of the capacitors between the terminations 22*a* and 22*b*. It has been found that the application of the additional dielectric material which places a high dielectric medium between the terminations of the capacitor, permitting a higher voltage capability whereby the electrical connector may withstand certain power surges. For example, size constraints of the connector likewise place constraints on the capacitor sizes that may be utilized. As such, in order to meet such size constraints, conventional capacitors may be able to meet power surges at voltages up to 500 volts RMS due to the breakdown of the air gap between the capacitor terminations. Utilization of additional dielectric material increases the dielectric strength of the medium between capacitor terminations thereby increasing the capability of the connector to withstand power surges at voltages up to 1,250 volts RMS, or greater.

In accordance with the preferred technique of applying the dielectric material to the capacitor sub-assembly, the material is applied subsequent to the soldering of the capacitors 22 to the printed circuit board 28. Upon attachment thereto, there exists between the printed circuit board 28 and the dielectric body 22*c* of the capacitors 22 a space 38 which would normally be filled with air. A series of apertures 40 is formed through the printed circuit board 28 in registry with each of the capacitors 22, apertures 40 communicating with the space 38. The dielectric material 36, which is in fluid curable form, is inserted through the apertures 40 into the spaces 38 and around the side surfaces of each of the capacitors 22. As used herein, the term "curable" is intended to mean a viscous material in fluid form that, with time, cures to a firm state without the need for physical constraints. Preferably, the curable dielectric material is applied under a suitable pressure. Further, an additional coating of curable dielectric material may be applied, as depicted in FIG. 3, longitudinally continuously along the capacitors 22 on the surface of the capacitors opposite the spaces 38. In the preferred arrangement, the curable dielectric material is a material sold under the trade name CHIP BONDER purchased from Loctite Corporation, Connecticut. This material is normally used as an insulative adhesive to hold components in place for soldering and has been found to have the suitable dielectric properties for enhancing the dielectric capability of the electrical filter connector hereof as well as having the fluid properties for ease of application and curing. It should be appreciated that other techniques for applying the curable dielectric material may also be utilized within the contemplated scope of the invention. For example, a common aperture in registry with plural of the capacitors and communicating with plural spaces may be used. Also, the curable dielectric material 36 may be applied to the surface of the substrate 28 prior to soldering the capacitors thereto. Whatever the application technique, the application of the dielectric material, preferably fully perimetrically around the dielectric body 22c of each capacitor enhances the dielectric capability.

Figure 6:
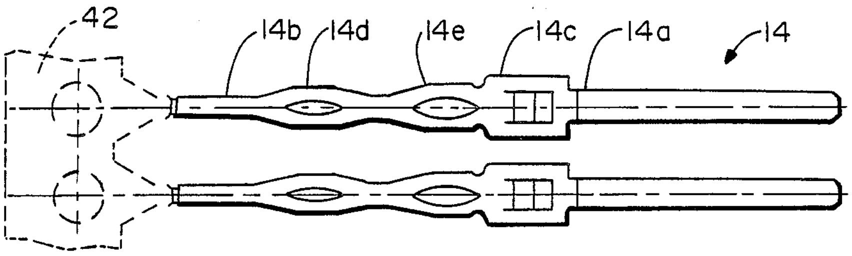
FIG. 6 is a plan view showing a pair of electrical contacts of the improved electrical filter connector showing in phantom a carrier strip used during the manufacture thereof.

Referring now to FIGS. 2 and 6, the construction of the improved electrical filter connector is described. As illustrated in FIG. 6, the electrical contacts, two of which are shown attached to a removable carrier strip 42 during the preferred manufacturing operation, comprise a spring section 14a, a pin section 14b and a support section 14c. In the preferred form of the electrical contacts, the pin section comprises two compliant sections 14d and 14e. As is known in the electrical connector art, a compliant section is of the type that is used to make resilient electrical engagement to metallized walls of openings in a printed circuit board, wherein the compliant section includes tines or arm portions that are elastically deformable upon insertion of the compliant section into such metallized openings.

Upon withdrawal of the compliant sections from the metallized openings, the board 28 may be used. In the preferred construction of the electrical contact of the subject connector, the compliant section 14d serves as a compliant terminal for insertion of the connector into a system circuit board, such as board 16. Compliant section 14e is utilized in the subject connector in the preferred arrangement, to make electrical connection to the capacitors in the capacitor sub-assembly as will be set forth.

In the preferred construction of the electrical filter connector, the insulative housing 12 comprises a base 44 and an insert 46. Captively retained between the base and the insert is the support section 14c which is defined particularly by a shoulder 14f which includes a portion projecting from each of the contacts substantially transversely to the pin sections thereof. The metal shell 18 is attached to and supported by the base 44.

The capacitor sub-assembly 26 is attached in the electrical filter connector 10 at its underside. The pin sections 14b of each of the electrical contacts are inserted through the metallized openings 30 of the printed circuit board 28 such that the compliant sections 14e are disposed in press fit electrical engagement with the metallized portions 32 of the openings 30. Tabs 18b on the metal shell 18 are bent around the marginal edges of the capacitor sub-assembly 26 to engage the ground springs 20, thus causing electrical connection amongst the metal shell 18, ground springs 20 and capacitor terminations 22b.

In use, as shown in FIG. 2, the electrical connector 10 of the subject invention is attached to the system circuit board 16 by inserting the compliant terminals 14d into metallized openings 16a of the system circuit board 16 such that the compliant terminals 14d are disposed in a press fit engagement therewith. During such insertion, a force, such as force F, as schematically shown in FIG. 2, may be applied to the base 44 of the housing 12, either directly or through a dust cover (not shown). Force F is transferred to the shoulder portion 14f and thus to the pin sections 14b for attachment to the circuit board 16. During insertion of the contacts 14 into the system board 16, the ground springs 20 engage conductive traces 16b formed on the system board 16, and such ground springs 20 resiliently deform to provide a pressure engagement with the traces 16b. In use, traces 16b may be electrically connected to a ground potential, thereby attaching to ground through the ground spring 20 the capacitor terminations 22b and the metal shell 18. Terminations 22a are electrically connected through respective contacts 14b to electrical circuit devices that may be connected to the metallized portions 16a on the system circuit board 16.

Having described the preferred embodiment of the invention, it should now be appreciated that variations may be made thereto without departing from the contemplated scope of the invention. For example, it should be understood that while the preferred contact structure comprises two compliant sections 14d and 14e the contact pin sections may be formed with neither of these compliant sections but rather with a straight-through pin which may be soldered to both the metallized portions 32 on the sub-assembly 26 and to the metallized portions 16a on the system board 16. Further, another variation may include the use of a single compliant section, such as 14e which may be press fit into the metallized openings 32 in the capacitor sub-assembly with the contact terminals comprising a straight-through pin for ultimate soldering to the metallized openings 16a in the system circuit board 16. Accordingly, the preferred embodiments described herein are intended in an illustrative rather than a limiting sense. The true scope of the invention is set forth in the claims appended hereto.

We claim:

1. In a method of making an electrical filter connector of the type including an insulative housing supporting a plurality of electrical contacts, a metal shell supported by said housing substantially surrounding said contacts, a plurality of capacitive elements therein, the improvement comprising the steps of:

providing a substrate with metallized openings therethrough in receipt therein of individual electrical contacts and with a metallized strip on a surface of said substrate spaced from said metallized openings;

providing a plurality of capacitive elements, each being of the type having a first termination and a second termination with a dielectric body therebetween and electrically attaching said first terminations individually to respective portions of said metallized openings and electrically attaching said second terminations to said metallized strip;

applying a curable dielectric material onto the dielectric body of each capacitive element; and electrically attaching each of said metallized openings of said substrate to said respective electrical contacts.

2. A method of making an electrical filter connector according to claim 1, wherein said curable dielectric material is applied perimetrically around each dielectric body.

3. A method of making an electrical filter connector according to claim 1, wherein curable dielectric material is applied to a surface of said substrate and then said capacitive elements are attached to said substrate surface.

4. A method of making an electrical filter connector according to claim 1, wherein said capacitive elements are attached to said substrate and then said dielectric material is applied to said dielectric body.

5. A method of making an electrical filter connector according to claim 4, wherein upon attachment of said capacitive elements to said substrate a space is formed between said dielectric body and said substrate, and wherein an aperture is provided through said substrate in registry with plural capacitive elements and in communication with plural said spaces, curable dielectric material being disposed into said plural spaces through said aperture.

6. A method of making an electrical filter connector according to claim 4, wherein upon attachment of said capacitive elements to said substrate a space is formed between said dielectric body and said substrate, and wherein an aperture is provided through said substrate adjacent each dielectric body, each aperture being in communication with a respective space, dielectric material being disposed into each space through said apertures.

7. A method of making an electrical filter connector according to claim 6, further including the additional step of applying a curable dielectric coating to each capacitive element dielectric body on a body surface opposite the capacitive element body surface communicating with said space.

8. A method of making an electrical filter connector according to claim 1, wherein said metallized openings of said substrate are electrically attached to said electrical contacts by soldering.

9. A method of making an electrical filter connector according to claim 1, wherein each of said electrical contacts is formed to have a compliant section, and wherein said metallized openings of said substrate are electrically attached to said electrical contacts by inserting said compliant portions individually into said metallized openings in press-fit engagement.

10. A method of making an electrical filter connector according to claim 1, further including the step of electrically attaching a ground spring to said metallized strip.

11. A method of making an electrical filter connector according to claim 10, wherein a further metallized strip is formed on a surface of said substrate opposite said metallized strip, said ground spring being formed to have an extent in electrical attachment to both said metallized strip and said further metallized strip.

12. A method of making an electrical filter connector according to claim 1, wherein said capacitive elements are discrete, monolithic, multi-layer capacitors.

13. In a method of making an electrical filter connector of the type including an insulative housing supporting a plurality of electrical contacts, a metal shell supported by said housing substantially surrounding said contacts, a plurality of capacitive elements therein, the improvement wherein a capacitor sub-assembly, in attachment with the connector, is formed by the steps of:

providing a substrate with conductive openings therethrough for receipt therein of individual electrical contacts and with a conductive strip on a surface of said substrate spaced from said conductive openings;

providing a plurality of capacitors, each being of the type having a first termination and a second termination with a dielectric body therebetween and electrically attaching said first capacitor terminations individually to respective portions of said conductive openings and electrically attaching said second capacitor terminations to said conductive strip;

electrically attaching a resilient ground spring to said conductive strip;

applying a curable dielectric material onto the dielectric body of each capacitor; and then electrically attaching said sub-assembly to said connector by attaching each of said conductive openings of said substrate to said respective electrical contacts.

14. A method of making an electrical filter connector according to claim 13, wherein said curable dielectric material is applied perimetrically around each capacitor dielectric body.

15. A method of making an electrical filter connector according to claim 13, wherein said capacitors are attached to said substrate and then said curable dielectric material is applied to said dielectric body.

16. A method of making an electrical filter connector according to claim 15, wherein upon attachment of said capacitors to said substrate a space is formed between said dielectric body and said substrate, and wherein an aperture is provided through said substrate adjacent each dielectric body, each aperture being in communication with a respective space, curable dielectric material being disposed into each space through said apertures.

17. A method of making an electrical filter connector according to claim 16, further including the additional step of applying a curable dielectric coating to each capacitor dielectric body on a body surface opposite the capacitor body surface communicating with said space.

18. A method of making an electrical filter connector according to claim 13, wherein said conductive openings of said substrate are electrically attached to said electrical contacts by soldering.

19. A method of making an electrical filter connector according to claim 13, wherein each of said electrical contacts is formed to have a compliant section, and wherein said conductive openings of said substrate are electrically attached to said electrical contacts by inserting said compliant portions individually into said conductive openings in press-fit engagement.

* * * * *